US009929987B2

(12) United States Patent
Bouzid et al.

(10) Patent No.: US 9,929,987 B2
(45) Date of Patent: Mar. 27, 2018

(54) VOICE ENABLED SOCIAL ARTIFACTS

(75) Inventors: Ahmed Tewfik Bouzid, McLean, VA (US); David James Rennyson, Centreville, VA (US); Michael Jerry Saylor, Tysons Corner, VA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 653 days.

(21) Appl. No.: 13/539,840

(22) Filed: Jul. 2, 2012

(65) Prior Publication Data
US 2013/0080918 A1 Mar. 28, 2013

Related U.S. Application Data

(60) Provisional application No. 61/504,060, filed on Jul. 1, 2011.

(51) Int. Cl.
*H04L 12/58* (2006.01)
*G06F 17/30* (2006.01)

(52) U.S. Cl.
CPC ...... *H04L 51/046* (2013.01); *G06F 17/30893* (2013.01); *H04L 51/32* (2013.01)

(58) Field of Classification Search
CPC .......... G06F 3/16; G06F 3/167; G06F 3/0482; G06F 17/3074; G06F 17/30893; H04L 51/046; H04L 51/32
USPC .......... 715/716, 727–729, 741, 744
See application file for complete search history.

(56) References Cited

U.S. PATENT DOCUMENTS

| | | | |
|---|---|---|---|
| 6,606,596 B1 | 8/2003 | Zirngibl et al. | |
| 6,940,953 B1 | 9/2005 | Eberle et al. | |
| 8,458,265 B1 * | 6/2013 | Gailloux | G06Q 50/01 709/206 |
| 8,639,805 B2 * | 1/2014 | Patel et al. | 709/224 |
| 2004/0107169 A1 | 6/2004 | Lowe | |
| 2007/0220092 A1 | 9/2007 | Heitzeberg et al. | |
| 2007/0274496 A1 | 11/2007 | Singh et al. | |
| 2008/0059189 A1 | 3/2008 | Stephens | |

(Continued)

FOREIGN PATENT DOCUMENTS

| | | |
|---|---|---|
| WO | 03015380 A1 | 2/2003 |
| WO | 2010076770 A2 | 7/2010 |

OTHER PUBLICATIONS

PCT Notification of Transmittal of the International Search Report and the Written Opinion for International Application No. PCT/US12/45256 dated Sep. 14, 2012, 8 pages (Continued)

*Primary Examiner* — Andrew Tank
(74) *Attorney, Agent, or Firm* — Lewis Roca Rothgerber Christie LLP

(57) ABSTRACT

A user is prompted to select a social site for generating a voice enabled social artifact. A user selection of the social site is received. Responsive to receiving the user selection, information associated with an account of the user on the social site is obtained. The user is prompted to select a social artifact associated with the social site for voice enablement. A user selection of the social artifact is received. The selected social artifact is configured for voice enablement. The selected social artifact is displayed on the social site with an indication that the selected social artifact is voice enabled.

17 Claims, 7 Drawing Sheets

(56) References Cited

U.S. PATENT DOCUMENTS

| | | | |
|---|---|---|---|
| 2008/0059992 A1 | 3/2008 | Amidon et al. | |
| 2009/0316863 A1* | 12/2009 | Fitzsimmons | H04M 3/533 379/88.11 |
| 2010/0042684 A1 | 2/2010 | Broms et al. | |
| 2010/0238919 A1 | 9/2010 | Froelich | |
| 2010/0305732 A1* | 12/2010 | Serletic | 700/94 |
| 2011/0167350 A1* | 7/2011 | Hoellwarth | 715/727 |
| 2011/0177796 A1* | 7/2011 | Jacobstein | H04M 3/53383 455/413 |
| 2011/0188492 A1* | 8/2011 | Stoops | H04M 3/4938 370/352 |
| 2012/0108293 A1* | 5/2012 | Law | G06F 17/30056 455/557 |
| 2012/0201362 A1* | 8/2012 | Crossan | G10L 15/26 379/88.01 |
| 2012/0209902 A1* | 8/2012 | Outerbridge | G06Q 10/101 709/201 |
| 2013/0111348 A1* | 5/2013 | Gruber et al. | 715/727 |

OTHER PUBLICATIONS

European Office action for Application No. 12807858.1-1862, dated May 9, 2015, 9 pages.
European Supplemental Search Report for Application No. 12807858.1-1862, dated May 4, 2015, 115 pages.
Australian Government Patent Examination Report for Application No. 2012279138, dated Aug. 6, 2016, 3 pages.
European Patent Office Action for Application No. 12807858.1, dated Aug. 12, 2016, 10 pages.
European Patent Office action for Application No. 12 807 858.1, dated Jul. 14, 2017, 16 pages.

* cited by examiner

VOICE ENABLED SOCIAL ARTIFACTS

CROSS-REFERENCE TO RELATED APPLICATIONS

This application claims priority to and the full benefit of U.S. Provisional Application Ser. No. 61/504,060, filed Jul. 1, 2011, and titled "VOICE-ENABLED SOCIAL ARTIFACTS," the entire contents of which are incorporated herein by reference.

TECHNICAL FIELD

The following disclosure relates generally to enabling voice features in social artifacts.

BACKGROUND

Social networks are commonly used by users for keeping in touch with one another across a data network, such as the Internet. In some cases, user accounts have message boards where other users may post messages that can be seen by all users that access the message board across the data network.

SUMMARY

In a general aspect, a user is prompted to select a social site for generating a voice enabled social artifact. A user selection of the social site is received. Responsive to receiving the user selection, information associated with an account of the user on the social site is obtained. The user is prompted to select a social artifact associated with the social site for voice enablement. A user selection of the social artifact is received. The selected social artifact is configured for voice enablement. The selected social artifact is displayed on the social site with an indication that the selected social artifact is voice enabled.

Particular implementations may include one or more of the following features. The social site may include at least one of a social network website, a web-based messaging system, and an instant messaging system. The social artifact may include at least one of a web page on a social network website, a feed using a web-based messaging system, a chat message using an instant messaging system, and a broadcast message in a web-based messaging system.

Configuring the selected social artifact for voice enablement may comprise configuring the social artifact for supporting multimedia files. A user interface associated with the social artifact may be modified for displaying information on the multimedia files supported by the social artifact, the user interface including a web page hosted by the social site. The social artifact may be associated with a repository configured for storing the multimedia files supported by the social artifact, the repository hosted by a voice channel system and linked to the user interface by a network connection.

The multimedia files may include at least one of speech files, audio files and video files. The multimedia files may be generated by users associated with the social artifact.

A call may be received from a user. A number called by the user corresponding to the call may be determined. A voice enabled social artifact associated with the number may be identified based on determining the number. A message from the user may be recorded. A new multimedia file corresponding to the recorded message may be generated. The new multimedia file may be stored in the repository. Information may be displayed on the user interface associated with the new multimedia file.

The user interface may be configured for displaying the selected social artifact on the social site with the indication that the selected social artifact is voice enabled. Information may be displayed the user interface indicating messages from users of the social artifact, the messages saved as multimedia files in the repository. A user selection of a multimedia file may be received through the user interface. The selected multimedia file may be from the repository based on the user selection. The selected multimedia file may be provided to the user through the user interface and played on the user interface.

Prompting a user to select a social site for generating a voice enabled social artifact may comprises prompting the user to select the social site from among a plurality of social sites having social artifacts that are capable of being voice-enabled. Prompting the user to select a social artifact associated with the social site for voice enablement may comprise prompting the user to select the social artifact from among a plurality of social artifacts associated with the selected social site, the plurality of social artifacts capable of being voice-enabled.

Obtaining information associated with an account of the user on the social site may comprise receiving login information associated with the account of the user on the social site. Communication may be established with a server hosting the social site. The login information may be sent to the social site. Information associated with the account of the user may be received from the social site.

Receiving a user selection of a social artifact for voice enablement may comprise identifying social artifacts supported by the account of the user based on obtaining the information associated with the account of the user on the social site. Responsive to identifying the social artifacts, social artifacts that are capable of supporting voice enablement may be determined. The social artifacts that are capable of supporting voice enablement may be displayed on a user interface. Instructions may be provided to the user for selecting, from the displayed social artifacts, a social artifact for voice enablement.

Configuring the selected social artifact for voice enablement may comprise generating a token associated with the selected social artifact. The token may be provided to the user. A call may be received from the user. The call may be determined to be associated with the selected social artifact based on the token provided by the user upon establishing the call. A message from the user may be recorded. An audio greeting associating with the selected social artifact may be generated based on the recorded message. A calling number associated with the selected social artifact may be generated. Messages received using the calling number may be stored as multimedia files associated with the selected social artifact. The calling number may be displayed with the selected social artifact on the social site.

Other embodiments of this aspect include corresponding systems and computer program products. The system includes a processor and a voice channel server including instructions stored in a non-transitory medium for execution by the processor and configured to cause the processor to perform the above listed actions. The system also includes a voice channel database configured for storing multimedia files supported by the social artifact. In addition, the system includes a call handling system including instructions stored in the non-transitory medium for execution by the processor and configured to cause the processor to perform the above listed actions.

The details of one or more aspects of the subject matter described in this specification are set forth in the accompanying drawings and the description below. Other features, aspects, and advantages of the subject matter will become apparent from the description, the drawings, and the claims.

DETAILED DESCRIPTION

Figure 1:
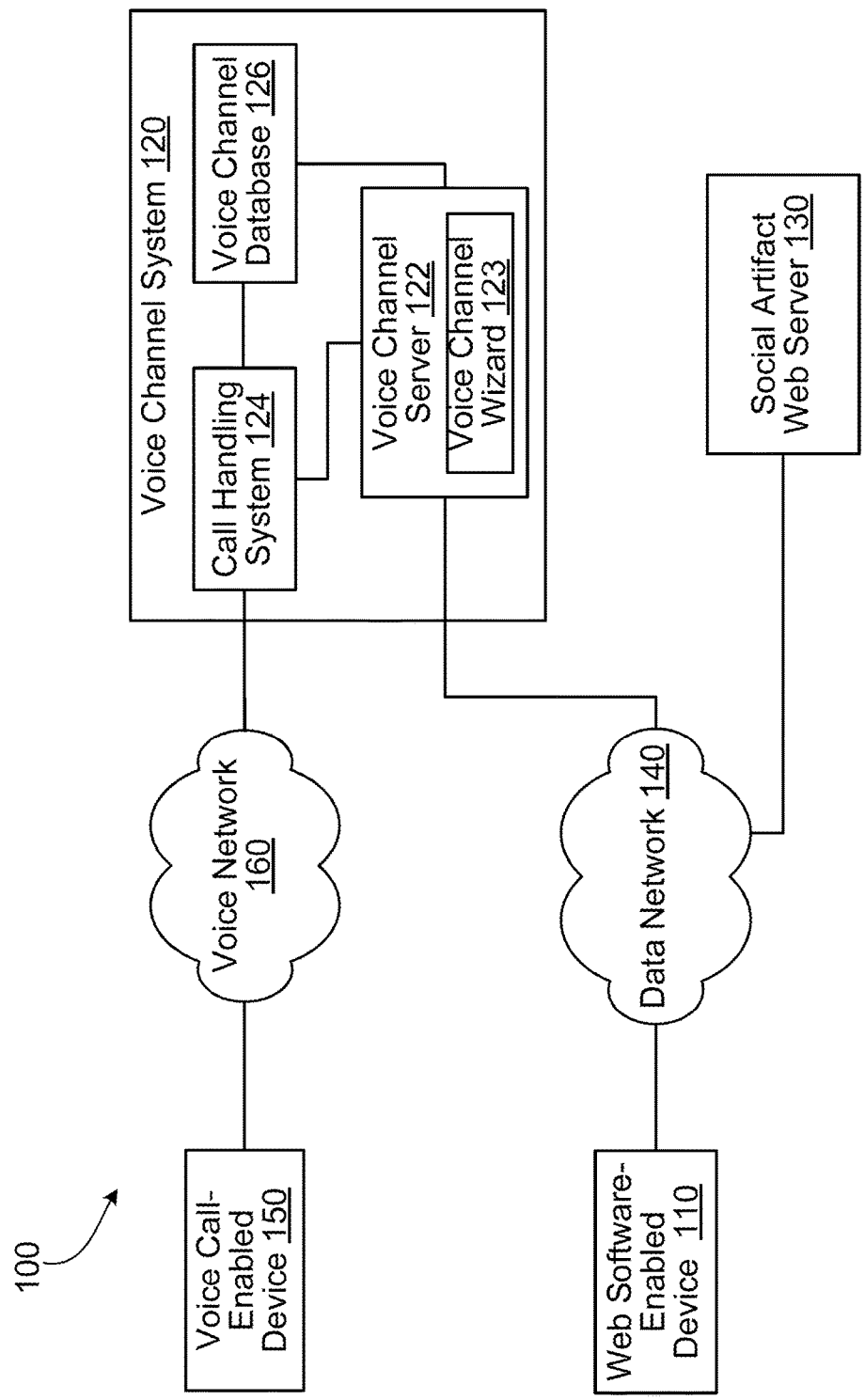
FIG. 1 illustrates an example of a communication system that facilitates generation and management of voice-enabled social artifacts.

Social networks provide a useful tool for people to keep in touch with others across a data network by, for example, broadcasting messages to a group. In some cases, a user may have a message board associated with the user's account that is accessible by others across the data network. Others who are connected to the user in the social network may leave messages on the user's message board. The messages may be visible to everyone in the user's circle. For example, a user's public profile may be seen on a webpage when visiting a social network website. The user's public profile may have a social artifact, such as a message board visible on the webpage where people may post messages (for example, a FACEBOOK™ Wall).

In this context, a social artifact may be a component of a social network associated with a user's account, which facilitates the display and management of a message stream related to the user's account. For example, a social artifact may be a web page in a user's account on a social network website where the user, and visitors who are connected to the user in the social network, may view messages posted by the user and/or the visitors. As another example, a social artifact may be a feed associated with a user's account in a web-based messaging system, on which the user posts messages that are viewable by others subscribing to the user's feed. A social artifact also may be a targeted message, for example the present status of a user of a social network, a chat message using an instant messaging client-server system, or a message broadcast by a first user of a web-based messaging system to other users who are following messages from the first user.

A social artifact allows the posting of messages, often short or temporal notes, for users to see while typically displaying the time and date the message was posted. A user's social artifact is visible to anyone with the ability to see his or her full profile. In some implementations, in addition to postings by visitors, a user's social artifact also displays other events that happened to the user's profile. It displays when information is changed, when the user changes his or her profile picture, and when the user connects with new people, among other things. A social artifact may be implemented as a software application, for example, as code written using HyperText Markup Language (HTML), JAVA™, PHP: HYPERTEXT PREPROCESSOR, ASP.NET, Extensible Markup Language (XML), Perl, or any other suitable programming language or software platform.

Examples of social network websites, web-based messaging systems and instant messaging client-server systems include, but are not limited to, FACEBOOK™, GOOGLE+™, TWITTER™, LINKEDIN™ and SKYPE™. Examples of social artifacts include FACEBOOK™ Wall and TWITTER™ messages. In the following description, the terms "social network," "social network website," "social website" and "social site" are used interchangeably, with each of them referring to any of social networks, web-based messaging systems and instant messaging client-server systems, and other suitable communication systems, along with websites providing user interfaces to the social networks, web-based messaging systems and instant messaging client-server systems, and other suitable communication systems.

Typically, messages posted on a user's social artifact, such as a message board, are written text that have been typed using a computer keyboard. Posting messages in this manner may be inconvenient in some cases, for example when a keyboard is not readily available or when it may be dangerous to type messages, such as when driving. It may be useful to provide users with services to post messages that do not rely on writing or typing text, for example by leaving voice messages.

In some implementations, services may be provided to enable voice messages to be posted on message boards. For example, a voice channel wizard, which may be a World Wide Web (WWW) based application, may be provided by a voice channel system that enables the posting of audio messages by a user to the same or to a different user's social artifact in a social network.

In some implementations, the voice channel wizard may provide a step-by-step web registration process to allow a user to configure a social artifact such that other users may post audio messages. Using the voice channel wizard, a user may be able to (i) identify a social network account (for example, FACEBOOK™, TWITTER™ or LINKEDIN™ account), (ii) identify a social artifact that the user wishes to voice-enable (for example, a FACEBOOK™ page or a TWITTER™ Feed), and (iii) record an audio greeting that visitors will hear when they access the social artifact. At the end of the process, the user is provided with an interface (for example, a phone number, a web page or a mobile smartphone application) to use to submit audio posts to the social artifact.

In this context, when a social artifact is voice-enabled, the social artifact is configured to support messages that are posted by users that include audio, such as, for example, a recording of the user's voice, in addition to or as an alternative to plain text and/or images. In some implementations, the social artifact is also configured to support messages that are posted by users that additionally or alternatively include video data or data using other media formats, such as animation or Portable Document Format (PDF) files.

The social artifact may be configured to support messages that include audio data and/or data that uses other media formats (for example, video data) by "linking" an audio channel to the social artifact. An audio channel calling number, also known as a channel number, is uniquely associated with the social artifact. In some cases, the channel number may be displayed with the social artifact (for example, on the FACEBOOK™ page). A visitor to the social artifact may place a call to the channel number—the call is received by the voice channel system, which records the message left by the visitor. The voice channel system saves the recorded message as an audio file and links the recorded message to the social artifact. Subsequent visitors to the social artifact may listen to the recorded message by selecting a representation of the message that is displayed on the social artifact.

The user who created the social artifact may be a manager of the newly created voice channel. All audio posts created by users who use the voice channel may be stored and managed "in the cloud," that is, remotely by the voice channel system, for the manager of the newly created voice channel.

By enabling creation of voice-enabled social artifacts quickly and effortlessly, the voice channel system may facilitate the establishment of a network of voice channels and may thereby infuse into the social network a whole new type of data stream that is qualitatively different from plain text and static images, among other data formats. Audio messages may strike a useful balance between ease of production (making a phone call and speaking freely may be easier than typing or creating a video, editing and uploading it) and the richness of a non-linear medium (as opposed to flat text).

The user may not be required to know any coding to voice enable a social artifact using the voice channel wizard. In some implementations, the skills a user would use to create a voice channel are basic web navigation and familiarity with the social network service and social artifacts he or she would like to enable.

In addition, since all of the audio produced by users of the voice enabled social artifacts may be stored and managed by the voice channel system, the creator/manager of a voice enabled social artifact typically may not have to store or manage the audio files produced by users of the voice channels.

FIG. 1 illustrates an example of a communication system 100 that facilitates generation and management of voice-enabled social artifacts. The communication system 100 includes a web software-enabled device 110 that is connected to a voice channel system 120 and a social artifact web server 130 through a data network 140. Communication system 100 also includes a voice call-enabled device 150 that is connected to the voice channel system 120 through a voice network 160.

The web software-enabled device 110 is a device configured with hardware and software that enables the device to interface with a user and run software applications to perform various processing tasks. For example, the web software-enabled device 110 may be a desktop computer, a laptop computer, a tablet computer, a smartphone, an e-book reader, a music player, or any other appropriate stationary or portable computing device.

The device 110 may include one or more processors configured to execute instructions stored by a computer readable medium for performing various client operations, such as input/output, data processing, and the like. The device 110 may include one or more software or hardware applications that are configured to establish data communications with other devices and servers across the data network 140, thereby allowing the device 110 to transmit and/or receive multimedia data via the data network 140. One or more software applications executed on the device 110 allow the device 110 to process the multimedia data exchanged via the data network 140. The software applications include web browsers and dedicated network applications such as instant messaging (IM) clients. The multimedia data exchanged via the data network 140 includes audio, video and textual data, and any other suitable data form.

The voice channel system 120 is a fully hosted, on-demand voice solutions platform. The voice channel system 120 includes a voice channel server 122, a call handling system 124 and a voice channel database 126 that are communicatively coupled to each other.

The voice channel server 122 is a web server that hosts a website providing tools for creating voice-enabled social artifacts. For example, the website is configured to present, to a user visiting the website, a voice channel wizard 123. Using the voice channel wizard 123, the user can create social artifacts with included voice features, which are described in the following sections.

The voice channel server 122 may be communicatively coupled to the social artifact web server 130. In addition to the web server mentioned previously, the voice channel server 122 includes mechanisms that facilitate interaction with the social artifact web server 130 such that information associated with voice-enabled social artifacts may be transferred between the voice channel database 126 and the social artifact web server 130 when users access voice-enabled social artifacts.

In some implementations, the voice channel server 122 may include one or more processors configured to execute instructions stored by a computer readable medium for performing various client operations, such as input/output, data processing, and the like. The server 122 may include one or more software or hardware applications that are configured to establish data and/or voice communications with other devices and servers over the data network 140 and the voice network 160, thereby allowing the server 122 to transmit and/or receive multimedia data.

The call handling system 124 includes an interactive voice response (IVR) system that is configured to interact with a user calling from the voice call-enabled device 150. The call handling system 124 is further configured to record voice messages that are generated by the user of the voice call-enabled device 150. The voice messages may include an audio greeting message that is generated by a first user creating a voice-enabled social artifact. The voice messages also may include other voice information that is generated by users who access the voice-enabled social artifact created by the first user. For example, the first user may create a voice-enabled page associated with the first user's account in a social network website, using the voice channel server 122. The first user may record a greeting for the voice-enabled page by calling the call handling system 124 from a phone used by the first user. Other users who are affiliated with the first user in the social network website may want to leave voice messages on the voice-enabled page created by the first user. To do so, other users also call the call handling system 124 from their respective phones and record voice messages for the voice-enabled page created by the first user.

In some implementations, the call handling system 124 may include one or more processors configured to execute instructions stored by a computer readable medium for performing various client operations, such as input/output, data processing, and the like. The call handling system 124 may include one or more software or hardware applications that are configured to establish data and/or voice communications with other devices and servers over the data network 140 and the voice network 160, thereby allowing the call handling system 124 to transmit and/or receive multimedia data, including voice, audio, video, images and text.

The voice messages associated with a voice-enabled social artifact that are recorded using the call handling system 124 are saved in the voice channel database 126. The voice channel database 126 includes a data storage mechanism for storing information associated with voice-enabled social artifacts. For example, the voice channel database 126 includes an array of hard disks that are configured with redundancy and backup features. For each voice-enabled social artifact that is created using the voice channel system 120, the voice channel database 126 stores all voice messages and other audio information associated with the social artifact. In one implementation, the voice messages are stored as audio files, with the audio files indexed by an account number associated with the user creating the voice-enabled social artifact.

The social artifact web server 130 is a server hosting a social website that facilitates interaction between users of the social website using social artifacts. For example, the social artifact web server 130 may host a social network website such as FACEBOOK™, GOOGLE+™ or LINKEDIN™. In a different implementation, the social artifact web server 130 may host a website for web-based messaging service such as TWITTER™. In yet another implementation, the social artifact web server 130 may host an instant messaging website such as SKYPE™. In some implementations, the social artifact web server 130 may include an array of servers, such as in a server farm, which together perform distributed hosting of a social website with a large number of users. In some implementations, the system 100 includes only one social artifact web server 130 that is connected to the voice channel system 120. In other implementations, the system 100 includes multiple instances of the social artifact web server 130, with each instance associated with a different social website. For example, system 100 may simultaneously include web servers for FACEBOOK™, GOOGLE+™ and LINKEDIN™.

The data network 140 connects the web software-enabled device 110 to the voice channel server 122 in the voice channel system 120, and also to the social artifact web server 130. The data network 140 also connects the voice channel server 122 to the social artifact web server 130. The data network 140 may include a circuit-switched data network, a packet-switched data network, or any other network able to carry data, for example, Internet Protocol (IP)-based or asynchronous transfer mode (ATM)-based networks. The data network 140 is configured to handle web traffic such as hypertext transfer protocol (HTTP) traffic and hypertext markup language (HTML) traffic. The data network 140 also may be configured to handle streaming traffic such as real-time protocol (RTP) traffic. The data network also may be configured to support voice using, for example, Voice-over-IP, Voice-over-ATM, or other comparable protocols used for voice data communications. Examples of the data network 140 includes the Internet, the World Wide Web (WWW), Wide Area Networks (WANs), Local Area Networks (LANs), analog or digital wired and wireless telephone networks (for example, Public Switched Telephone Network (PSTN), Integrated Services Digital Network (ISDN), and Digital Subscriber Line (xDSL)), radio, television, cable, satellite, and/or any other delivery or tunneling mechanism for carrying data.

The voice-enabled call device 150 is configured to place and receive calls across the voice network 160 and to establish voice communications sessions with servers, such as the call handling system 124, across the voice network 160 for transmitting voice messages. The voice-enabled call device 150 may be a cellular phone or a mobile personal digital assistant (PDA) with embedded cellular phone technology. The voice-enabled call device 150 also may be a mobile computing device or a general purpose computer that includes one or more software or hardware applications for performing voice communications across the voice network 160.

In some implementations, the device 150 may include one or more processors configured to execute instructions stored by a computer readable medium for performing various client operations, such as input/output, data processing, and the like. The device 150 may include one or more software or hardware applications that are configured to establish data communications with other devices and servers across the data network 140, thereby allowing the device 150 to transmit and/or receive multimedia data via the data network 140. One or more software applications executed on the device 150 allow the device 150 to process the multimedia data exchanged via the data network 140. The software applications include web browsers and dedicated network applications such as instant messaging (IM) clients. The multimedia data exchanged via the data network 140 includes audio, video and textual data, and any other suitable data form.

In some implementations, the web software-enabled device 110 and the voice-enabled call device 150 are implemented by a single or otherwise integrated device that is configured to enable data communications between the web software and the voice channel server 122 or the social artifact web server 130, and voice communications with the call handling system 124. For example, the single or otherwise integrated device may be a smart phone with voice call and web browsing capabilities.

The voice network 160 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The voice network 160 is configured to enable direct or indirect communications between the voice-enabled call device 150, and the call handling system 124 that is included in the voice channel system 120. Examples of the voice network 160 include the Internet, Wide Area Networks (WANs), Local Area Networks (LANs), analog or digital wired and wireless telephone networks (for example, Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the data network 140 and the voice network 160 are implemented by a single or otherwise integrated communications network configured to enable data communications amongst the web software-enabled device 110, the voice channel server 124 and the social artifact web server 130, and to enable voice communications between the voice-enabled call device 150 and the call handling system 124.

In some implementations, a user accesses the website hosted by the voice channel server 122 by establishing a communications path over the data network 140 between a web software-enabled device 110 associated with the user and the voice channel server 122. Once the communications path is established, the user can launch the website on the user's associated web software-enabled device 110 through suitable software and/or hardware applications that are executed on the web software-enabled device 110, for example, a web browser. Upon accessing the website, the user launches the voice channel wizard 123 on the website to create a voice-enabled social artifact.

The voice channel wizard 123 guides the user through instructions to create the voice-enabled social artifact. The voice channel wizard 123 prompts the user to select a social website from a list of available websites and then accesses the selected social website by establishing a communications path over the data network 140 between the voice channel server 122 and the social artifact web server 130 that is hosting the selected social website. Upon accessing the selected social website, the voice channel wizard 123 presents the social website log in page to the user and obtains the user's account information on the selected social website once the user logs in through the social website log in page.

Upon obtaining the user's account information on the selected social website, the voice channel wizard 123 retrieves a list of social artifacts associated with the user's account on the selected social website, that are available for voice enablement. The voice channel wizard 123 presents the list of available social artifacts to the user and prompts the user to select one or more social artifacts for enabling voice, and to configure the selected social artifact(s) using the voice channel wizard 123.

The voice channel wizard 123 obtains a calling number associated with the user and provides the user with a phone number to call to record an audio greeting to be associated with a social artifact that is selected for voice-enablement. The voice channel wizard 123 also provides a token to the user along with instructions to present the token when the user calls the phone number to record the audio greeting. The voice channel wizard 123 stores, for example in the voice channel database 125, information regarding the user's account on the selected social website, the selected social artifact, and the token that is provided to the user. The phone number is associated with the call handling system 124.

In some implementations, the voice channel wizard 123 provides the call handling system 124 with access to the information stored in the voice channel database 126 such that the call handling system 124 may modify the stored information as needed. The voice channel wizard 123 communicates with the call handling system 124 and the voice channel database 126 using pre-existing connections amongst the voice channel server 122, the call handling system 124 and the voice channel database 126. In some other implementations, the voice channel wizard 123 provides the call handling system 124 with limited access to the information stored in the voice channel database 126 such that the call handling system 124 may store audio files in the account associated with the user in the voice channel database 125, but is otherwise restricted from modifying the account associated with the user.

To complete the process of creating the voice-enabled social artifact, the user calls the phone number provided by the voice channel wizard 123, for example using the voice call-enabled device 150 associated with the user. Calling the phone number provided by the voice channel wizard 123 establishes a voice call over voice communications path between the voice call-enabled device 150 and the call handling system 124 over the voice network 160. Once the voice call is established, the call handling system 124 prompts the user to provide the token information that is associated with the user's account on the voice channel database 126. Once the user provides the token information and it is correctly matched to the user's account on the voice channel database 125, the call handling system 124 prompts the user to record an audio greeting.

The user speaks into the voice call-enabled device 150 and the user's speech is recorded by the call handling system 124. The recorded speech is stored on the voice channel database 126 and associated with the user's account. Subsequently, the speech may be used as the audio greeting associated with the user's voice-enabled social artifact. In some implementations, an IVR system associated with the call handling system 124 interacts with the user to ask for the token and to record the audio greeting. In some other implementations, a live agent associated with the call handling system 124 interacts with the user to ask for the token and to record the audio greeting.

In some implementations, the user may choose not to record an audio greeting, or the option to record an audio greeting may not be provided to the user. Instead, the voice channel system 120 may provide a default audio greeting that is associated with the user's voice-enabled social artifact. Alternatively, the voice channel system 120 may not provide an audio greeting at all.

In implementations that facilitate using audio greetings, when the user's account in the voice channel database 126 is updated with the audio greeting recorded by the user, the voice channel wizard 123 generates a calling number and associates the generated number with the user's voice-enabled social artifact. The voice channel wizard 123 provides the user with the generated calling number.

The user displays the generated calling number on the voice-enabled social artifact. Other users call the displayed calling number to leave voice messages for the user's voice enabled social artifact. When another user calls the displayed calling number, a call is established between the calling device used by the other user and the call handling system 124 over the voice network 160. The call handling system 124 plays the audio greeting associated with the user's account and prompts the calling user to leave a voice message for the user's voice-enabled social artifact. The calling user leaves a voice message by speaking into the calling device used by the calling user. The calling user's speech is recorded by the call handling system 124 as an audio file and is stored in the voice channel database 126 associated with the user's account. The voice channel wizard 123 sends information regarding the recorded voice messages to the social website hosting the voice-enabled social artifact. Subsequently, when the display of the voice-enabled social artifact is refreshed, for example on a displayed page view of the selected social website, an icon is displayed on the voice-enabled social artifact indicating the voice message left by the calling user. Other users may listen to the voice message by clicking on the icon, in which case the audio file is retrieved from the voice channel database 126 and played to the other users via devices used by the other users.

FIGS. 2A-2D are illustrations of an exemplary graphical user interface (GUI) 200 for a voice channel wizard that enables generation and management of voice-enabled social artifacts. The voice channel wizard may be the same as the voice channel wizard 123. However, in some implementations, the voice channel wizard may be different from the voice channel wizard 123. The following sections describe the GUI 200 and the associated voice channel wizard as implemented by the communication system 100. However, the GUI 200 and the associated voice channel wizard also may be implemented by other communication systems or system configurations.

Figure 2A:
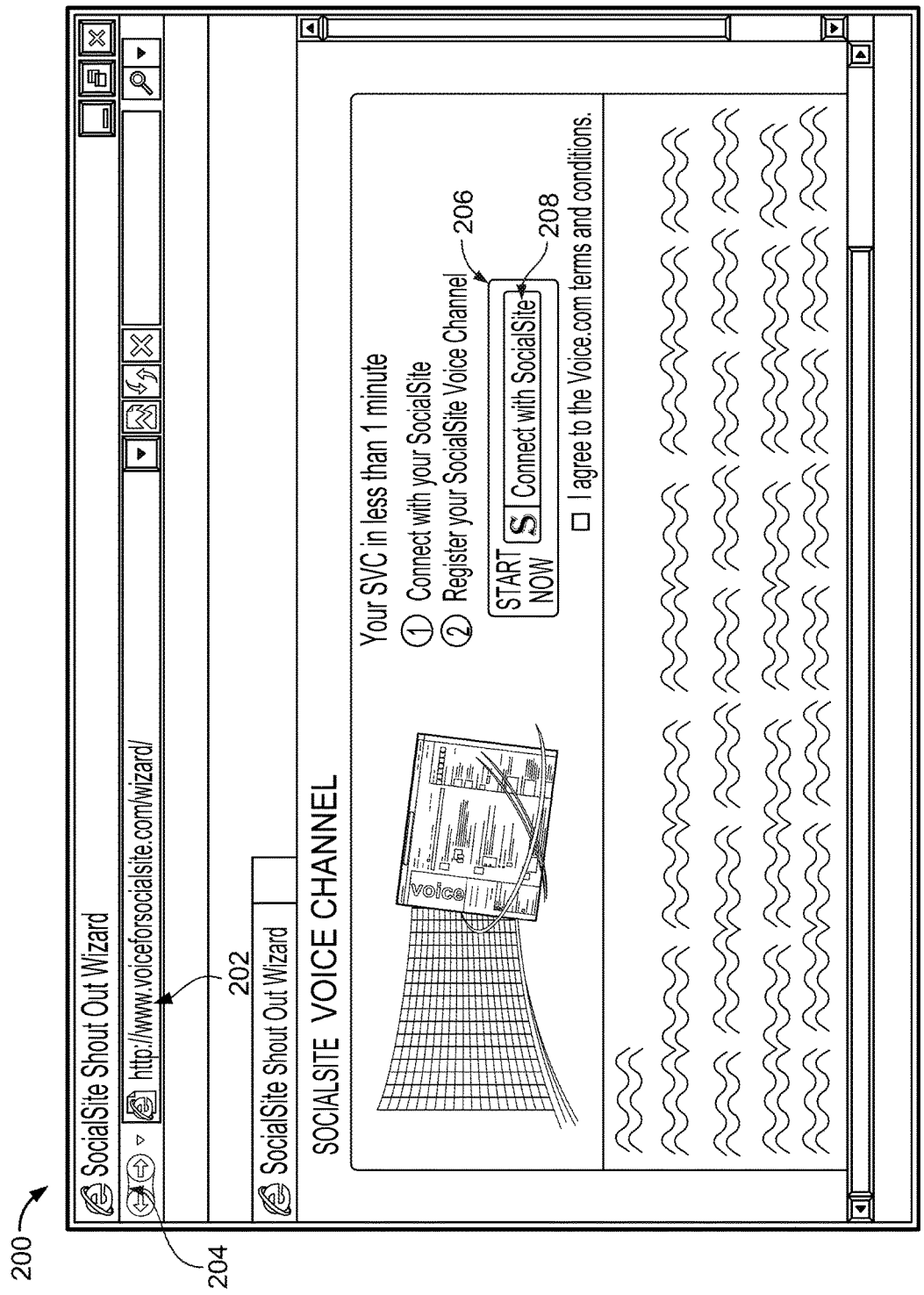
FIGS. 2A-2D are illustrations of an exemplary graphical user interface (GUI) for a voice channel wizard that enables generation and management of voice-enabled social artifacts.

Referring to FIG. 2A, the GUI 200 displays a webpage 202 on a web browser 204. The web browser 204 includes information on the webpage 202, a list 206 of social websites available for voice enablement, and a log in button 208 for logging in to a selected website.

The webpage 202 may be a page associated with the website hosted by the voice channel server 122. For example, the webpage 202 may provide the voice channel wizard 123. A user may access webpage 202 from the user's web software-enabled device 110, using the web browser software application 204 that is executed on the user's web software-enabled device 110. As previously described, to access the webpage 202, the user's web software-enabled device 110 establishes a data communications channel over the data network 140 with the voice channel server 122.

When the user accesses the webpage 202, the GUI 200 is presented to the user showing the voice channel wizard 123 running on the voice channel server 122. The voice channel wizard 123 includes hardware and/or software applications running on the voice channel server 122 that perform the operations of interacting with the user through the GUI 200 and creating the voice-enabled social artifact. In the following discussion, references to the GUI 200 are meant to include both the GUI 200 and the associated voice channel wizard 123.

The voice channel wizard 123 displays, using the GUI 200, a list 206 of one or more available social websites where the user may create a voice-enabled social artifact. For example, the list 206 may include a social network called "SocialSite." The user selects a social network from the list 206, for example, SocialSite, and logs in to the selected social network using the log in button 208 that is provided on the GUI 200. In some implementations, enabling the user to perceive the list 206 of available social networks includes visually presenting to the user a list of unique identifiers, where each unique identifier identifies websites corresponding to one of the available social networks. The unique identifiers may, for example, be Uniform Resource Locators (URLs) corresponding to the different websites of the different social networks.

In some implementations, the user has a pre-existing account in the social website selected by the user. However, in other implementations, the user may not have a pre-existing account in the selected social website. In such cases, the voice wizard 123 may provide an option on the GUI 200 for the user to register a new account on the social website selected by the user.

Referring to the example in which the user has a pre-existing account on the selected social website, upon the user clicking the log in button 208, the voice channel wizard 123 establishes a connection to the selected social website over the data network 140 and retrieves the log in screen for the selected social website. The user enters his or her log in information for the selected social website, for example, log in username and log in password. The selected social website verifies the user's log in information and, if the log in information is verified to be correct, sends information associated with the user's account on the social website to the voice channel wizard 123.

In some implementations, the information that is sent by the social website corresponds to the information requested by the voice channel wizard 123. Typically, the information requested by the voice channel wizard 123 include information used by the voice channel wizard 123 to facilitate creation of the voice-enabled social artifact.

Figure 2B:
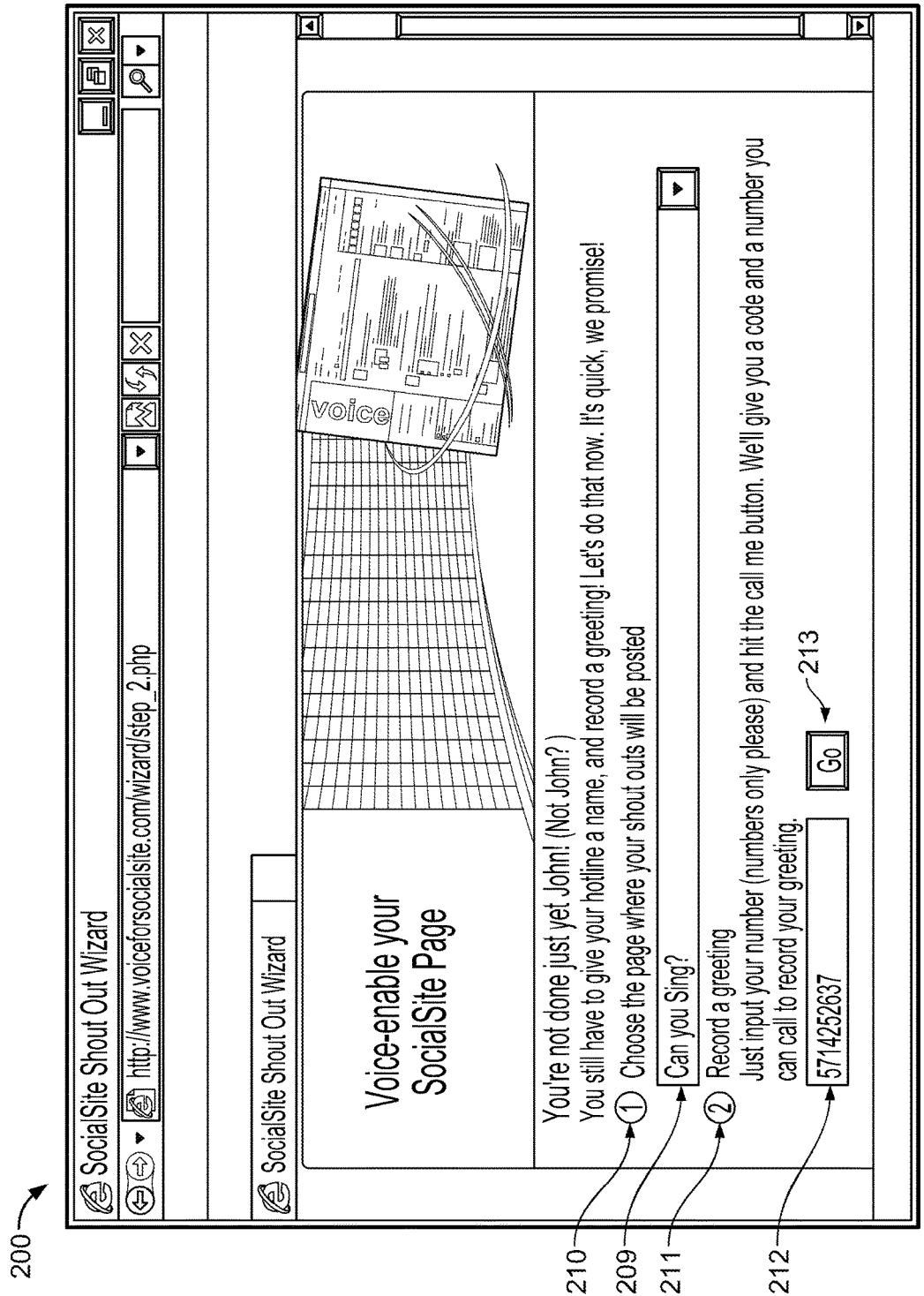

Upon examining the information obtained from the selected social network, the voice channel wizard 123 determines a list of one or more social artifacts associated with the user's account on the social website that may be configured for voice enablement, and displays such social artifacts on the GUI 200. FIG. 2B illustrates an exemplary GUI 200 for the voice channel wizard that displays a list of the social artifacts available for voice enablement. The GUI 200 includes one or more menus 209, instructions 210, 211, user editable fields 212 and finalization button 213.

The menu 209, when selected, displays names of one or more web pages associated with the user's social network account using a drop-down menu. The names of web pages that are displayed by the menu 209 includes web pages that the user can select for voice enablement. In some implementations, enabling the user to perceive the menu 209 of web pages includes visually presenting to the user a list of unique identifiers, where each unique identifier identifies one of the web pages. The unique identifiers may be, for example, URLs corresponding to the different web pages.

Instruction 210, which is associated with the menu 209, instructs the user to choose a page for the displayed list for enabling voice. In some implementations, the wizard 123 may refer to the voice feature as a "shout out" or simply as a "shout." When a user records a message or "shout out" to be linked with a selected page, the wizard 123 "posts" the "shout out" on the selected page.

As prompted by the instructions 210, the user selects an available social artifact by selecting one of the pages from the menu 209. For example, the user may select a page with the title "Can you Sing?" Using instructions 211 on the GUI 200, the voice channel wizard asks the user to enter a calling number associated with the user to record a greeting for the selected social artifact. The user enters a calling number in the field 212 provided by the GUI 200, and then presses the finalization button 213 to continue with the creating the voice-enabled social artifact.

Figure 2C:
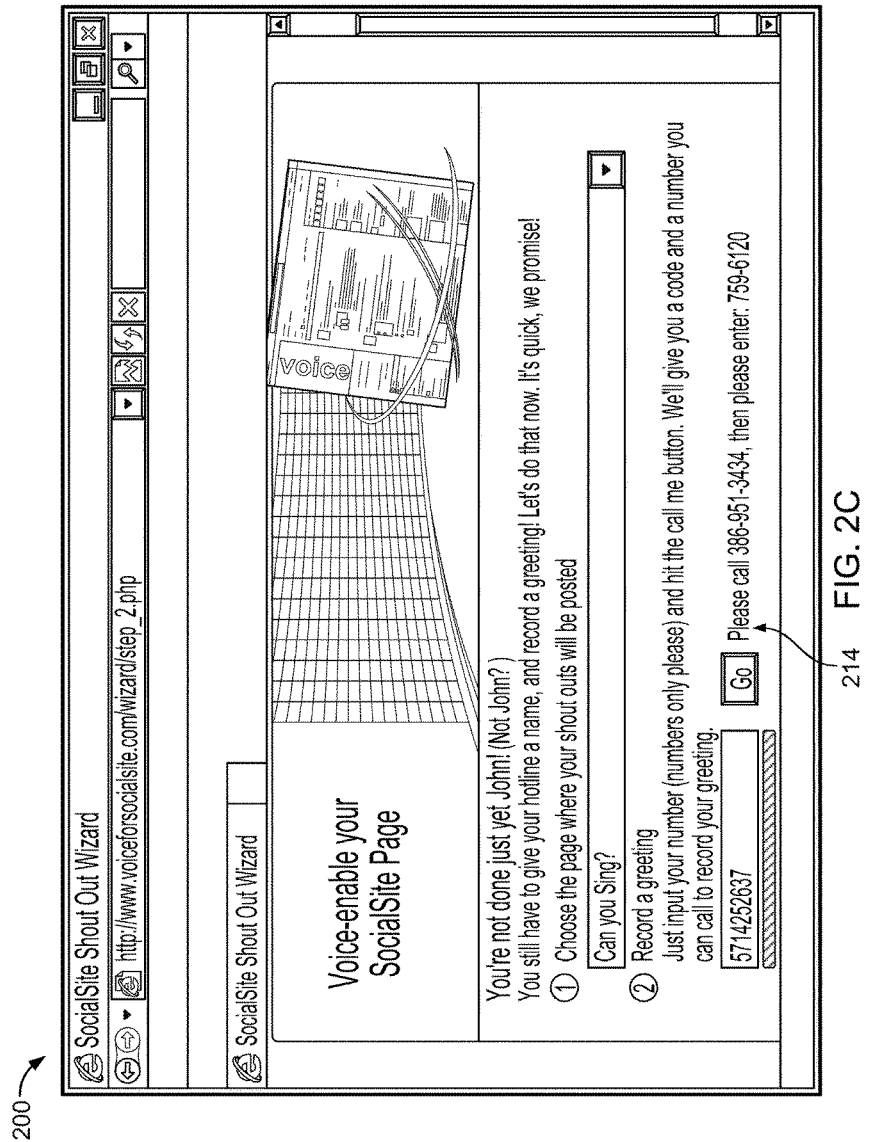

FIG. 2C illustrates an exemplary GUI 200 that is displayed by the voice channel wizard when the user presses the finalization button 213. The GUI 200 includes instructions 214 that are provided by the voice channel wizard upon the user pressing the finalization button 213. The instructions 214 include a unique token generated by the voice channel wizard, and a number that is provided for the user to call.

When the user presses the finalization button 213, the voice channel wizard 123 processes the information entered by the user through the GUI 200. The wizard 123 determines the social artifact selected by the user to enable voice and registers the calling number associated with the user. The wizard 123 creates an account in the voice channel database 126 for the user and saves the information associated with the user's account on the social network, the selected social artifact, the user's calling number, and any other information that is used for creating the voice-enabled social artifact.

The wizard 123 generates the unique token associated with the user's newly created account in the voice channel database 126 and provides the token to the user, along with the number to call in the instructions 214. For example, the wizard 123 may display, in the instructions 214, the number "386-951-3434" that the user is instructed to call. In addition, the wizard 123 may display, in the instructions 214, the token "759-2160" that the user is instructed to enter when the call is established and the user is prompted. The provided number is associated with the call handling system 124. The user is instructed to call the provided number and enter the token when prompted upon call establishment. Then the user may record an audio greeting that is to be associated with the user's voice-enabled social artifact.

Figure 2D:
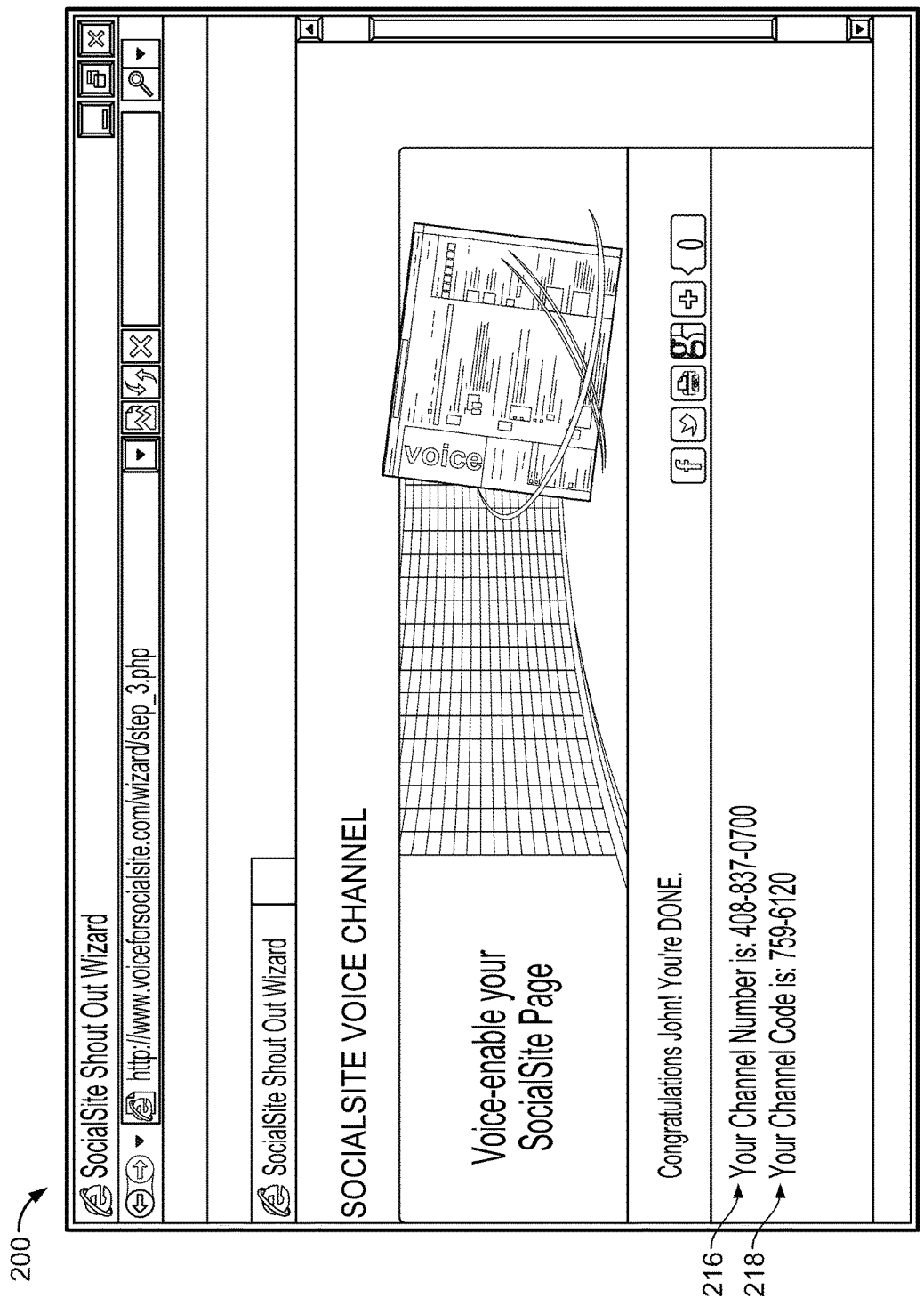

FIG. 2D illustrates an exemplary GUI 200 that is displayed when the selected social artifact is voice-enabled. The GUI 200 includes information 216 displaying a unique channel number for the voice-enabled social artifact, and information 218 providing a channel code for the voice-enabled social artifact.

When the user calls the number provided by the instruction 214, the call may be handled by the call handling system 124, which verifies the user's information and records a speech spoken by the user as the audio greeting that is to be associated with the user's voice-enabled social artifact. The recorded audio greeting is saved in the voice channel database 125, associated with the account created for the user. The call handling system 124 interacts with the voice channel wizard 123 to inform the voice channel wizard 123 of the audio greeting that is recorded for the user's voice-enabled social artifact and saved in the voice channel database 126. The voice channel wizard 123 then generates the unique channel number for the user's voice-enabled social artifact and provides the channel number to the user though information 216 in the GUI 200. The voice channel wizard 123 also provides the token that is generated for the user's account as the channel code information 218 for the user's voice-enabled social artifact. Subsequently, the user may access the voice-enabled social artifact on the website for the social network and configure the voice-enabled social artifact to display the unique channel number that is associated with the voice-enabled social artifact.

Figure 3:
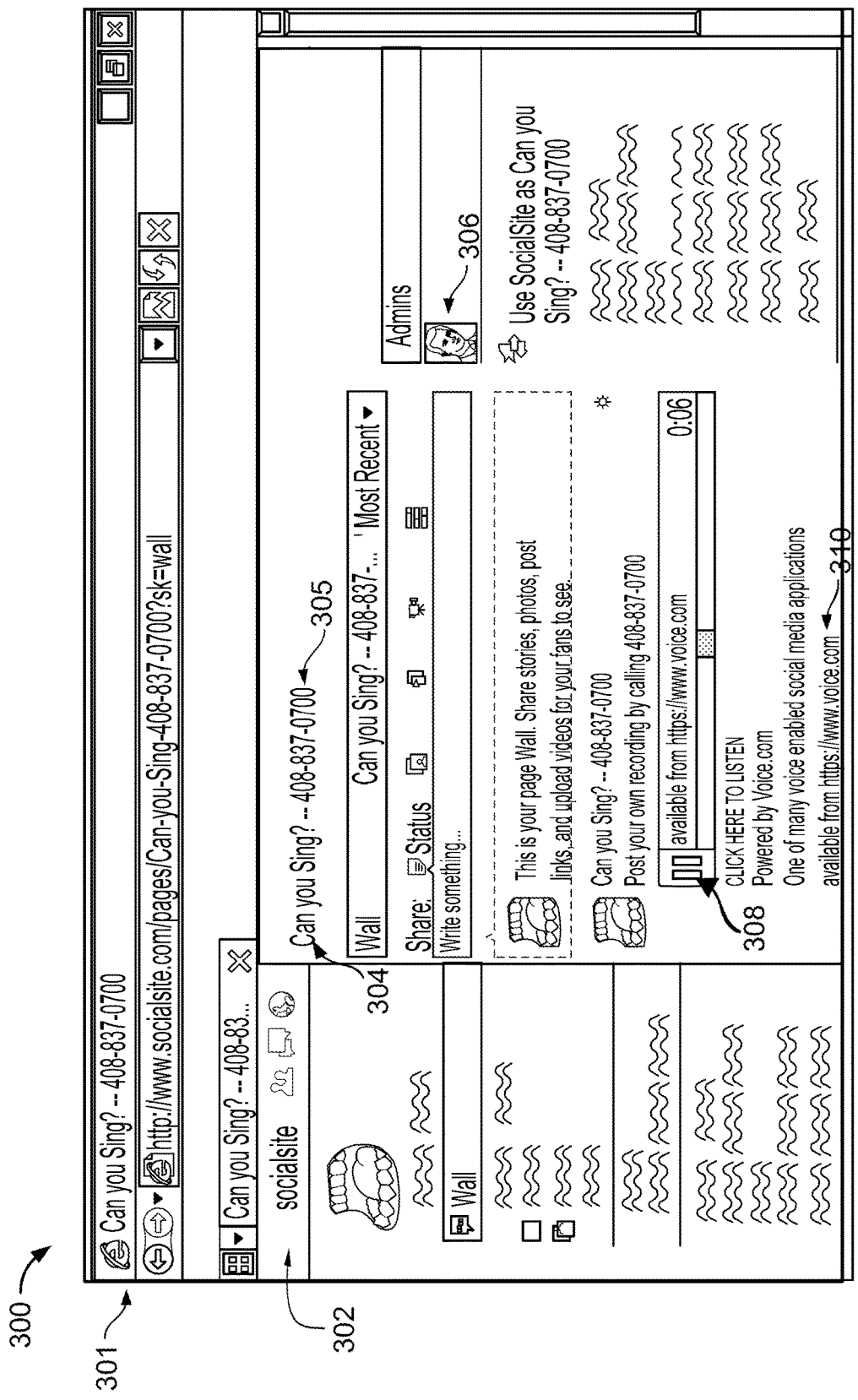
FIG. 3 illustrates an example of a GUI showing a voice-enabled social artifact.

FIG. 3 illustrates an example of a GUI 300 showing a voice-enabled social artifact. The GUI 300 may be displayed for a voice-enabled social artifact created by a user through the GUI 200 using the communication system 100. However, in some implementations, the GUI 300 may be displayed for a voice-enabled social artifact created using other GUIs and/or other communication systems.

The GUI 300 shows a page 301 for a voice-enabled social artifact. The page 301 includes an identity of the associated social website 302, along with the name 304 and the channel number 305 of the voice-enabled social artifact. The page 301 also includes admin information 306 on the user who created the voice-enabled social artifact, icon 308 corresponding to a voice message indicated on the page 301, and information 310 associated with the website that was used to create the voice-enabled social artifact.

The GUI 300 may be associated with a web browser on which the page 301 is displayed. In some implementations, the page 301 may be seen by any other user who is given permission by the user to access the corresponding voice-enabled social artifact. In some implementations, the page 301 indicates the social website 302 that is associated with the page 301, for example FACEBOOK™. However, in some other implementations, the page 301 may not provide any indication of the social website the voice-enabled social artifact is associated with, or it may provide a different indication.

The page 301 shows the name 304 and the channel number 305 of the associated voice-enabled social artifact. The name 304 corresponds to the name of the social artifact that was selected by the user, while the channel number 305 corresponds to the channel number that was generated by the voice channel wizard 123 and provided to the user through the GUI 200, as described previously.

On the right hand side of the page 301, admin information 306 for the user who created the voice-enabled social artifact is shown, for example in a section titled "Admins." However, in some implementations, the user who created the voice-enabled social artifact may not be shown, or the user may be shown in a different manner.

Voice messages can be recorded for the voice-enabled social artifact by calling the channel number 305 using any voice-enabled device. A voice message that is recorded for the voice-enabled social artifact may be shown as a "message post" on the page 301. A message post indicates a voice message using the icon 308, and may include information such as the identity of the user who created the message post and a time when the message post was created.

In some implementations, when a user posts a voice message on a social artifact, such as, page 301 shown in FIG. 3, the voice channel server 122 acts as a proxy for the user with respect to the social artifact and automatically creates a message to be posted on the social artifact on behalf of the user. Unlike conventional messages that the user may post on the social artifact, which may typically only include text typed in by the user, the message posted by the voice channel server 122 may include text automatically generated by the voice channel server 122 (for example, HTML text or JavaScript text). The automatically generated text may be text that, after being processed by a web browser or by the social artifact web server 130, results in the presentation of a message post on the social artifact that includes a link (for example, a hyperlink) that is user-selectable to access and play the audio file stored in the voice channel database 126 that corresponds to the user-recorded voice message.

In some implementations, the social site and/or social artifact is unable to distinguish between text automatically posted by the voice channel server 122 on behalf of the user from text that the user himself or herself typed in or otherwise directly posted on the social artifact. For example, the voice channel server 122 may merely provide the web browser of the user with the appropriate text to include in the posted message and instruct, or enable, the user to instruct the web browser to post the message with the automatically generated text. The web server 130 may then receive the text from the web browser and may process the text of the posted message in the same way that it processes any other posted message received from users and without regard to the fact that all or some of the text in the posted message was produced by the voice channel server 122.

In other implementations, the social site and/or social artifact is able to distinguish text directly inputted or typed in by a user from text that was automatically generated by the voice channel server 122. In these implementations, the social artifact web server 130 is able to process the respective different types of text differently (for example, the web server 130 may use conventional HTML processing for text manually inputted by the user and may instead use different, customized processing for text automatically generated by the voice channel server 122).

In other implementations, the voice channel server 122 does not automatically generate text to be inserted into a posted message that, when processed by the web server 130 or a web browser, results in a display of the icon 308 selectable to access a corresponding recorded voice message. Instead, the voice channel server 122 communicates commands or instructions directly to the social artifact web server 130 to post a message that includes the icon 308 selectable to access the corresponding voice message.

In some implementations, the icon 308 is an audio player with which the user can interact to play the audio message.

In some implementations in which the message post is created through the automatic insertion of text by the voice channel server 122 on behalf of the user, the text inserted into the posted message by the voice channel server 122 may be text that includes one or more links to the audio player (or code segments) that, when processed by a web browser, enable the audio player to be visually displayed within the posted message and that enable a user to interact with the audio player to play the recorded voice message. As shown in FIG. 3, the audio player may include controls to facilitate user playback of the audio message and may visually depict a duration of the audio message. In some implementations, the audio player may visually depict an identifier of a website (for example, "www.voice.com") corresponding to the voice channel server 122. The controls may include a play button, a pause button, and/or a rewind button. In some implementations, the user that posts a voice message may also type in or otherwise input his or her own written text as a supplement to the voice message that will also be included in the message post (for example, "Listen to my awesome vocal rendition of Bohemian Rhapsody by clicking on the play button in the player below.").

A user who accesses the page 301 can listen to a message post displayed on the page 301 using any audio-enabled device by clicking on or otherwise selecting the displayed icon 308 corresponding to the message post. When a user clicks on or otherwise selects the icon 308, the social website contacts the voice channel server 122 to retrieve the voice message associated message post corresponding to the icon 308. As described previously, the social website may contact the voice channel server 122 through a communications channel that is established over the data network 140 between the social artifact web server 130 and the voice channel server 122.

Users may create multiple voice messages for a voice-enabled social artifact. When there are multiple such voice messages, the page 301 associated with the voice-enabled social artifact may display multiple message posts corresponding to the multiple voice messages. Each voice message may be indicated by a message post. The message post associated with each voice message may include an icon 308. The message post associated with each voice message also may include the identity of the user who created the message post and a time when the message post was created.

A user can listen to any voice message by clicking or otherwise selecting the icon 308 in the associated message post. The audio file corresponding to the voice message associated with the icon 308 is retrieved by the voice channel server 122 from the user account in voice channel database 126 that is associated with the user who created the voice-enabled social artifact. The voice channel server 122 transmits the audio file to the social website or web browser over the established communications channel. Upon receiving the audio file, the social website or web browser plays the voice message to the user who clicked on the icon 308. In some implementations, the audio file associated with the icon 308 may be stored by the social website locally on the social artifact web server 130 and played to the user who clicked on the icon 308, without requiring retrieving the audio file from the voice channel server 122.

In some implementations, the page 301 displays information 310 associated with the website hosted by the voice channel server 122 that was accessed to create the voice-enabled social artifact, or stores the audio files corresponding to the voice message posts shown on the page 301, or both. However, in some other implementations, the page 301 may not display the information 310.

In some implementations, the page 301 may display a textual transcription of the voice message associated with the voice message post represented by the icon 308. The page 301 may display the textual transcription of the voice message in addition to the icon 308 such that the audio file can be played along with displaying the textual transcription. Alternatively, the page 301 may display only the textual transcription without the icon 308 such that the audio files cannot be played. The transcription of the voice messages may be done by the voice channel system 120, or the transcription may be done by the social website hosting the page 301 upon receiving instructions from the voice channel system 120.

In some implementations, the page 301 may display a list of message posts associated with messages that are in different formats. For example, some of the message posts may be for voice messages, while some of the message posts may be for textual messages, and some other message posts may be for video messages. The page 301 may display the message posts corresponding to the different formats together. For example, a message post associated with a voice message may be followed by a message post for a textual message, which may be followed by a message post for another voice message. Alternatively, the page 301 may display the message posts in separate groups, where each group of message posts includes message posts associated with messages in a similar format, for example, there may be a first group for message posts associated with voice messages, a second group for message posts associated with textual messages and a third group for message posts associated with video messages In some implementations, the user who created voice-enabled social artifact may manage the voice-enabled social artifact using the social website hosting the page 301. The user may have full administrative rights to modify the page 301. The user may modify or remove the name 304 or voice channel number 305. The user may also modify or delete the voice message posts, including removing the icon 308. In some implementations, when the user deletes a voice message post, the associated audio file is deleted from the voice channel database 126. However, in other implementations, the voice channel system 120 may save the audio file even if the corresponding icon 308 representing voice message post is deleted from the page 301.

Figure 4:
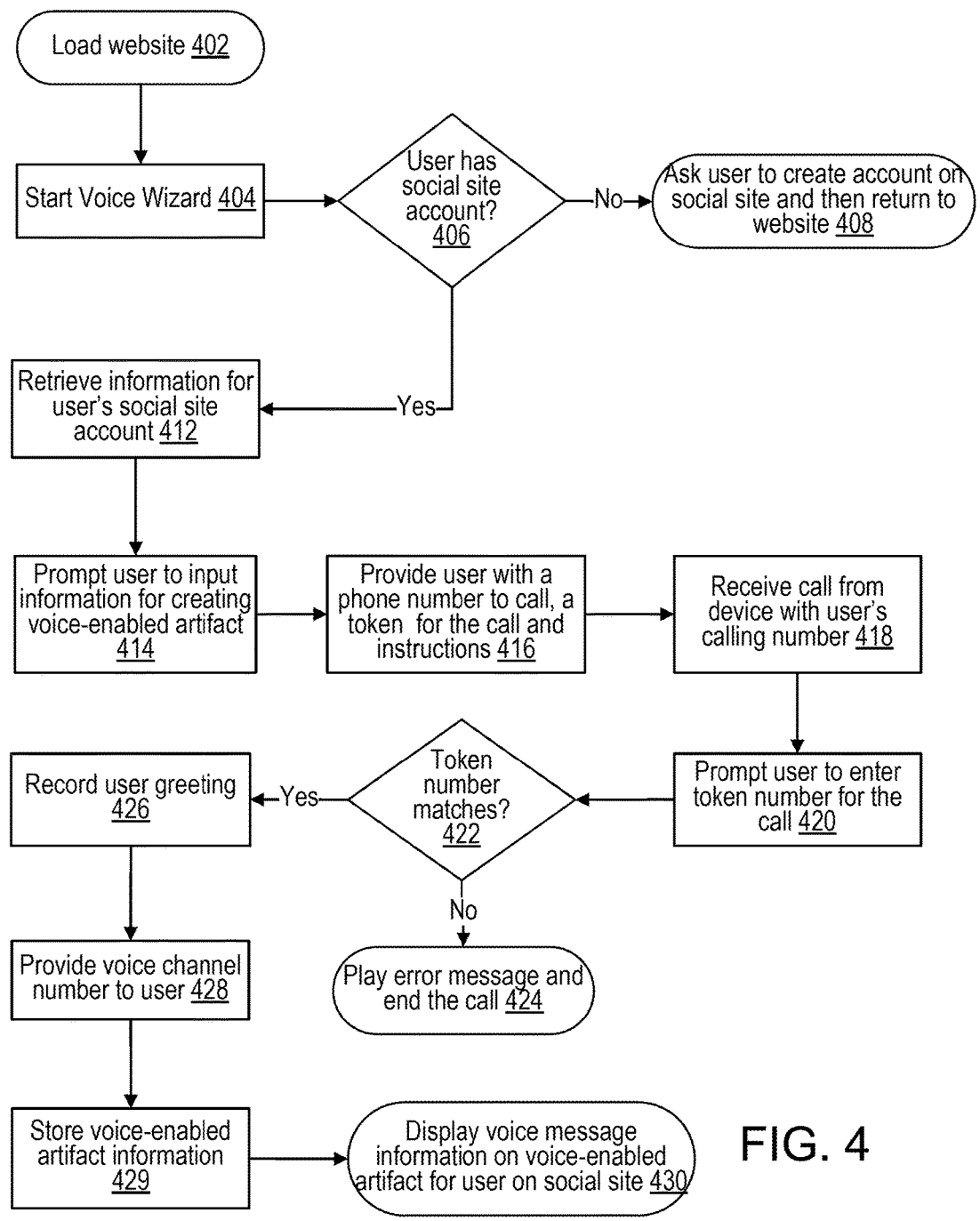
FIG. 4 is a flow chart illustrating an example of a process that is executed by a voice channel system for facilitating generation of a voice-enabled social artifact.

FIG. 4 is a flow chart illustrating an example of a process 400 that is executed by a voice channel system for facilitating generation of a voice-enabled social artifact. The process 400 may be performed, for example, by the voice channel system 120 when the user of the web software-enabled device 110 and voice call-enabled device 150 interacts with the voice channel system 120. Specifically, the process 400 may be performed by the voice channel server 122 along with the voice channel wizard 123 and the call handling system 124 as components of the voice channel system 120.

The following describes the process 400 being performed by components of the communication system 100. However, the process 400 also may be performed by other communication systems or system configurations.

The process 400 is performed when the voice channel system 120 receives communications from the web software-enabled device 110 associated with a user requesting access to the website hosted by the voice channel server 122. Then the voice channel server loads the website (402). For example, the voice channel server 122 loads the website on a web browser application on the web software-enabled device 110 by interacting with the web software-enabled device 110.

When the website is loaded on the web browser on the user's web software-enabled device 110, the voice channel server launches the voice wizard to create a voice-enabled social artifact (404). For example, the voice channel server 122 launches the voice channel wizard 123 upon receiving some communication from the user's web software-enabled device 110. As part of launching the voice channel wizard 123, the voice channel server 122 displays the GUI 200 associated with the website on the user's web software-enabled device 110 to guide the user with creating the voice-enabled social artifact.

The voice channel wizard checks whether the user has an account on a social site (406). For example, based upon information entered by the user using the GUI 200, the voice channel wizard 123 may check whether the user's log in information is accepted by the social website selected by the user.

If the voice channel wizard 123 determines that the user does not have an account on the social website selected by the user, the voice channel wizard may ask the user to create an account on the social site and then return to the website (408). For example, the voice channel wizard 123 may determine that the user does not have an account on the selected social website based on an error message that is received by the voice channel wizard 123 from the social website when the voice channel wizard 123 sends the user's log in information to the social website. Then the voice channel wizard 123 may display a message on the GUI 200 asking the user to create an account on the selected social website and then return to the website to create the voice-enabled social artifact. However, in some implementations, the voice channel wizard 123 may not display any message to the user upon receiving an error message from the selected social website.

In some implementations, the voice channel wizard 123 may interact with the selected social website using an application programming interface (API) that is provided by the social website. However, in other implementations, the voice channel wizard 123 may interact with the social website using an API that is provided by the voice channel wizard 123.

On the other hand, the user's log in information is accepted by the selected social website, the voice channel wizard retrieves information for the user's account on the social site (412). In some implementations, the information provided may be limited to the information that the social website permits the voice channel wizard 123 to access. However, in other implementations, the social website may permit the voice channel wizard 123 to retrieve any information requested by the voice channel wizard 123.

After retrieving the information associated with the user's account on the selected social website, the voice channel wizard 123 determines which of the available social artifacts associated with the user's account on the selected social website can be configured for voice enablement. The voice channel wizard 123 then displays the information on the available social artifacts to the user, for example using the page 301, and prompts the user to input information for creating the voice-enabled social artifact (414). For example, the voice channel wizard 123 may display a menu 209 of available social artifacts, and ask the user through instructions 210 to select a social artifact, record a greeting 211 and enter a calling number 212 associated with the user.

Upon receiving the user input, the voice channel wizard provides the user with a phone number to call and a token for the call, along with instructions (416). The voice channel wizard 123 also informs the call handling system 124 to expect a call from the calling number associated with the user, and to verify the user using the token that is provided to the user.

When the user calls the phone number provided by the voice channel wizard, the call is received (418) by the call handling system. For example, the call handling system 124 receives the call and interacts with the user using an IVR system. In other implementations, the call handling system 124 receives the call and interacts with the user using a live agent.

The call handling system 124 identifies the user using the calling number associated with the user's device, which is provided to the call handling system 124 by the voice channel wizard 123. Upon identifying the user, the call handling system prompts the user to enter the token for the call (420).

The call handling system checks whether the token number matches (422). For example, when the user enters the token for the call, the call handling system 124 compares the token entered by the user with the token that is provided to the call handling system 124 by the voice channel wizard 123, so as to determine whether the token number entered by the user matches the token provided by the voice channel wizard 123.

If the two tokens do not match, the call handling system plays an error message and ends the call (424). However, in some implementations, the call handling system ends the call without playing an error message. In some other implementations, the call handling system sends a message to the user informing the user that the tokens did not match and asks the user to enter the token again, consequent to which call handling system repeats the process of comparing tokens. The call handling system may repeat the process a pre-determined number of times, for example, three times, before ending the call.

On the other hand, if the tokens match, the call handling system records the user greeting (426). For example, the call handling system 124 instructs the user to say a greeting using the user's calling device and records the user's speech as an audio file. The audio file is configured to be played as the greeting message whenever someone calls the voice channel number associated with the user's voice-enabled social artifact that is being created.

Once the user greeting is recorded, the call handling system 124 informs the voice channel wizard 123. The voice channel wizard 123 generates a voice channel number for the user's voice-enabled social artifact. The voice channel wizard provides the voice channel number to the user (428). For example, the voice channel wizard 123 displays information 216 on the GUI 200 providing the voice channel number to the user.

In some implementations, along with the voice channel number, the voice channel wizard 123 provides channel code information 218 for the voice channel on the GUI 200. In some implementations, the channel code may be the same number as the token that was previously provided to the user, while in other implementations, the two numbers are distinct. In some implementations, the call handling system 124 generates the voice channel number after the user greeting is recorded, and provides the generated voice channel number to the voice channel wizard 123 when informing the voice channel wizard 123 that the user greeting is recorded.

Along with providing the voice channel number and/or the channel code to the user, the voice channel wizard stores the information associated with the voice-enabled social artifact (429). For example, the voice channel wizard 123 creates an account in the voice channel database 126 corresponding to the user's newly created voice-enabled social artifact and saves information corresponding to the user's account in the voice channel database 126. The saved information may include information associated with the user's social website account, detailed information regarding the voice-enabled social artifact that is provided by the social website, the recorded user greeting for the voice-enabled social artifact, the voice channel number and the channel code, in addition to other information that may be used for the voice-enabled social artifact.

Subsequently, whenever a voice message is recorded using the voice channel number associated with the user's voice-enabled social artifact, an audio file is generated for the recorded message and stored in the voice channel database 126 associated with the user's account. The voice channel system displays voice message information on the voice-enabled artifact for user on the social site (430), for example by displaying message posts for the recorded voice messages on page 301, along with an icon 308 for each message post. Whenever a user processes the displayed information, the audio file associated with the voice message is sent to the social artifact web server 130 hosting the selected social website and the voice message is played as an audio recording using the voice-enabled social artifact.

The disclosed and other examples can be implemented as one or more computer program products, that is, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for providing voice-enabled social artifacts in a voice channel system having at least one processor, the method comprising the steps of:

generating a prompt to a web-enabled user device that prompts a user to select a social media site;

receiving from the web-enabled user device a user selection of the social media site;

responsive to receiving the user selection, obtaining information associated with an account of the user on the social media site;

generating a prompt to the web-enabled user device that prompts the user to select a pre-existing message stream interface associated with the social media site, wherein the message stream interface is available for voice enablement;

receiving a user selection of the message stream interface;

generating a message to the social media site for causing the social media site to transition the selected message stream interface for the account of the user on the social media site from being not voice-enabled to being voice-enabled by:
- generating a calling number for the user, and
- including the calling number in the message to the social media site for display on the selected message stream interface on the social media site for the account of the user;

providing an indication that the selected message stream interface has transitioned to being voice-enabled for prompting users to post a voice message on the selected message stream interface for the account of the user;

establishing a voice call with a voice-enabled user device associated with a caller that is other than the user and that calls the calling number displayed on the social media site for the account of the user;

prompting the caller via the voice-enabled user device associated with the caller to select creation of a caller voice message associated with the account of the user on the social media site; and responsive to receiving the caller voice message from the voice-enabled user device associated with the caller, generating a message to the social media site for causing the social media site to display an indication for the caller voice message on the selected message stream interface on the social media site for the account of the user.

2. The method of claim 1, where the method includes:

generating a prompt to the web-enabled user device that prompts the user to create at least one voice feature associated with the message stream interface;

receiving the voice feature from the web-enabled user device and storing the voice feature on the voice channel system; and sending the voice feature to the social media site for display on the selected message stream interface on the social media site.

3. The method of claim 1, where the method includes:

receiving a message from the social media site that includes a voice message created using the selected message stream interface on the social media site for the account of the user on the social media site; and storing the voice message on the voice channel system.

4. The method of claim 3, where the method includes:

receiving from the web-enabled user device a user request for messages associated with the account of the user on the social media site; and responsive to the user request for messages, sending the voice message to the web-enabled user device.

5. The method of claim 3, where the method includes:

establishing a voice call with a voice-enabled user device associated with the user;

prompting the user via the voice call to select playback of messages associated with the account of the user on the social media site; and responsive to the user selection for playback of messages, sending the voice message to the voice-enabled user device.

6. The method of claim 1, where the method includes:

receiving a message from the social media site that indicates selection of the caller voice message on the selected message stream interface on the social media site for the account of the user; and responsive to receiving the message that indicates the selection of the caller voice message, generating a message to the social media site that includes the caller voice message for playback using the selected message stream interface on the social media site for the account of the user.

7. A voice channel system comprising:

a processor; and a memory coupled to the processor, the memory storing instructions that, when executed by the processor, cause the processor to:

generate a prompt to a web-enabled user device that prompts a user to select a social media site;

receive from the web-enabled user device a user selection of the social media site;

responsive to receiving the user selection, obtain information associated with an account of the user on the social media site;

generate a prompt to the web-enabled user device that prompts the user to select a pre-existing message stream interface associated with the social media site, wherein the message stream interface is available for voice enablement;

receive a user selection of the message stream interface;

generate a message to the social media site for causing the social media site to transition the selected message stream interface for the account of the user on the social media site from being not voice-enabled to being voice-enabled by:
- generating a calling number for the user, and
- including the calling number in the message to the social media site for display on the selected message stream interface on the social media site for the account of the user;

provide an indication that the selected message stream interface has transitioned to being voice-enabled for prompting users to post a voice message on the selected message stream interface for the account of the user;

establish a voice call with a voice-enabled user device associated with a caller that is other than the user and that calls the calling number displayed on the social media site for the account of the user;

prompt the caller via the voice-enabled user device associated with the caller to select creation of a caller voice message associated with the account of the user on the social media site; and responsive to receiving the caller voice message from the voice-enabled user device associated with the caller, generate a message to the social media site for causing the social media site to display an indication for the caller voice message on the selected message stream interface on the social media site for the account of the user.

8. The voice channel system of claim 7, where the memory includes instructions that, when executed, cause the processor to:

generate a prompt to the web-enabled user device that prompts the user to create at least one voice feature associated with the message stream interface;

receive the voice feature from the web-enabled user device and storing the voice feature on the voice channel system; and send the voice feature to the social media site for display on the selected message stream interface on the social media site.

9. The voice channel system of claim 7, where the memory includes instructions that, when executed, cause the processor to:
    receive a message from the social media site that includes a voice message created using the selected message stream interface on the social media site for the account of the user on the social media site; and
    store the voice message on the voice channel system.

10. The voice channel system of claim 9, where the memory includes instructions that, when executed, cause the processor to:
    receive from the web-enabled user device a user request for messages associated with the account of the user on the social media site; and
    responsive to the user request for messages, send the voice message to the web-enabled user device.

11. The voice channel system of claim 9, where the memory includes instructions that, when executed, cause the processor to:
    establish a voice call with a voice-enabled user device associated with the user;
    prompt the user via the voice call to select playback of messages associated with the account of the user on the social media site; and
    responsive to the user selection for playback of messages, send the voice message to the voice-enabled user device.

12. The voice channel system of claim 7, where the memory includes instructions that, when executed, cause the processor to:
    receive a message from the social media site that indicates selection of the caller voice message on the selected message stream interface on the social media site for the account of the user; and
    responsive to receiving the message that indicates the selection of the caller voice message, generate a message to the social media site that includes the caller voice message for playback using the selected message stream interface on the social media site for the account of the user.

13. A computer-program product including instructions that are embodied in a non-transitory computer-readable medium for execution by a processor and configured to cause the processor to perform operations in a voice channel system comprising:
    generating a prompt to a web-enabled user device that prompts a user to select a social media site;
    receiving from the web-enabled user device a user selection of the social media site;
    responsive to receiving the user selection, obtaining information associated with an account of the user on the social media site;
    generating a prompt to the web-enabled user device that prompts the user to select a pre-existing message stream interface associated with the social media site, wherein the message stream interface is available for voice enablement;
    receiving a user selection of the message stream interface;
    generating a message to the social media site for causing the social media site to transition the selected message stream interface for the account of the user on the social media site from being not voice-enabled to being voice-enabled by:
    generating a calling number for the user, and
    including the calling number in the message to the social media site for display on the selected message stream interface on the social media site for the account of the user;
    providing an indication that the selected message stream interface has transitioned to being voice-enabled for prompting users to post a voice message on the selected message stream interface for the account of the user;
    establishing a voice call with a voice-enabled user device associated with a caller that is other than the user and that calls the calling number displayed on the social media site for the account of the user;
    prompting the caller via the voice-enabled user device associated with the caller to select creation of a caller voice message associated with the account of the user on the social media site; and
    responsive to receiving the caller voice message from the voice-enabled user device associated with the caller, generating a message to the social media site for causing the social media site to display an indication for the caller voice message on the selected message stream interface on the social media site for the account of the user.

14. The computer-program product of claim 13, the computer-program product further including instructions for:
    generating a prompt to the web-enabled user device that prompts the user to create at least one voice feature associated with the message stream interface;
    receiving the voice feature from the web-enabled user device and storing the voice feature on the voice channel system; and
    sending the voice feature to the social media site for display on the selected message stream interface on the social media site.

15. The computer-program product of claim 13, the computer-program product further including instructions for:
    receiving a message from the social media site that includes a voice message created using the selected message stream interface on the social media site for the account of the user on the social media site; and
    storing the voice message on the voice channel system.

16. The computer-program product of claim 15, the computer-program product further including instructions for:
    receiving from the web-enabled user device a user request for messages associated with the account of the user on the social media site; and
    responsive to the user request for messages, sending the voice message to the web-enabled user device.

17. The computer-program product of claim 15, the computer-program product further including instructions for:
    establishing a voice call with a voice-enabled user device associated with the user;
    prompting the user via the voice call to select playback of messages associated with the account of the user on the social media site; and
    responsive to the user selection for playback of messages, sending the voice message to the voice-enabled user device.

\* \* \* \* \*